US009104868B2

(12) United States Patent
Dalcher et al.

(10) Patent No.: US 9,104,868 B2
(45) Date of Patent: *Aug. 11, 2015

(54) SYSTEM, METHOD, AND COMPUTER PROGRAM PRODUCT FOR DETECTING UNWANTED DATA BASED ON SCANNING ASSOCIATED WITH A PAYLOAD EXECUTION AND A BEHAVIORAL ANALYSIS

(71) Applicant: McAfee Inc., Santa Clara, CA (US)

(72) Inventors: Gregory Dalcher, Tigard, OR (US); Jonathan Edwards, Portland, OR (US)

(73) Assignee: McAfee Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/943,709

(22) Filed: Jul. 16, 2013

(65) Prior Publication Data
US 2014/0026216 A1    Jan. 23, 2014

Related U.S. Application Data

(63) Continuation of application No. 12/166,198, filed on Jul. 1, 2008, now Pat. No. 8,490,186.

(51) Int. Cl.
*H04L 29/06* (2006.01)
*G06F 21/56* (2013.01)

(52) U.S. Cl.
CPC .............. *G06F 21/56* (2013.01); *G06F 21/564* (2013.01); *G06F 21/566* (2013.01); *H04L 63/1416* (2013.01)

(58) Field of Classification Search
CPC .................... G06F 21/564; H04L 63/1416
USPC ........................................................ 726/22
See application file for complete search history.

(56) References Cited

U.S. PATENT DOCUMENTS

| 7,373,666 B2 * | 5/2008 | Kaler et al. ................. 726/23 |
| 2004/0003286 A1 | 1/2004 | Kaler et al. |
| 2008/0016314 A1 * | 1/2008 | Li et al. ..................... 711/200 |

OTHER PUBLICATIONS

Dalcher, "System, method, and computer program product for dynamically adjusting a level of security applied to a system", U.S. Appl. No. 12/111,851, filed Apr. 29, 2008, 27 Pages.
Dalcher, "System, method, and computer program product for identifying unwanted data based on an assembled execution profile of code", U.S. Appl. No. 12/042,923, filed Mar. 5, 2008, 25 Pages.

\* cited by examiner

*Primary Examiner* — Longbit Chai
(74) *Attorney, Agent, or Firm* — Blank Rome LLP.

(57) ABSTRACT

A system, method, and computer program product are provided for detecting unwanted data based on scanning associated with a payload execution and a behavioral analysis. In use, an execution of a payload is detected, utilizing interface monitoring. Additionally, process memory associated with the execution of the payload is scanned. Further, a behavioral analysis is performed. Still yet, unwanted data is detected based on the scanning and the performance of the behavioral analysis.

25 Claims, 4 Drawing Sheets

SYSTEM, METHOD, AND COMPUTER PROGRAM PRODUCT FOR DETECTING UNWANTED DATA BASED ON SCANNING ASSOCIATED WITH A PAYLOAD EXECUTION AND A BEHAVIORAL ANALYSIS

FIELD OF THE INVENTION

The present invention relates to detecting unwanted data, and more particularly to detecting malware associated with a payload execution.

BACKGROUND

Traditionally, security systems have been utilized for detecting unwanted data to secure systems from such unwanted data. However, conventional techniques utilized for detecting unwanted data associated with payload executions have generally exhibited various limitations. For example, unwanted data may be obscured by using execution packing which results in the unwanted data having a non-execution form (e.g. a stored, dormant form) that differs from a payload (e.g. execution form) of the unwanted data. Unfortunately, security systems have customarily only scanned the unwanted data in its non-execution form, thus allowing obscured unwanted code to go undetected.

There is thus a need for addressing these and/or other issues associated with the prior art.

SUMMARY

A system, method, and computer program product are provided for detecting unwanted data based on scanning associated with a payload execution and a behavioral analysis. In use, an execution of a payload is detected, utilizing interface monitoring. Additionally, process memory associated with the execution of the payload is scanned. Further, a behavioral analysis is performed. Still yet, unwanted data is detected based on the scanning and the performance of the behavioral analysis.

DETAILED DESCRIPTION

Figure 1:
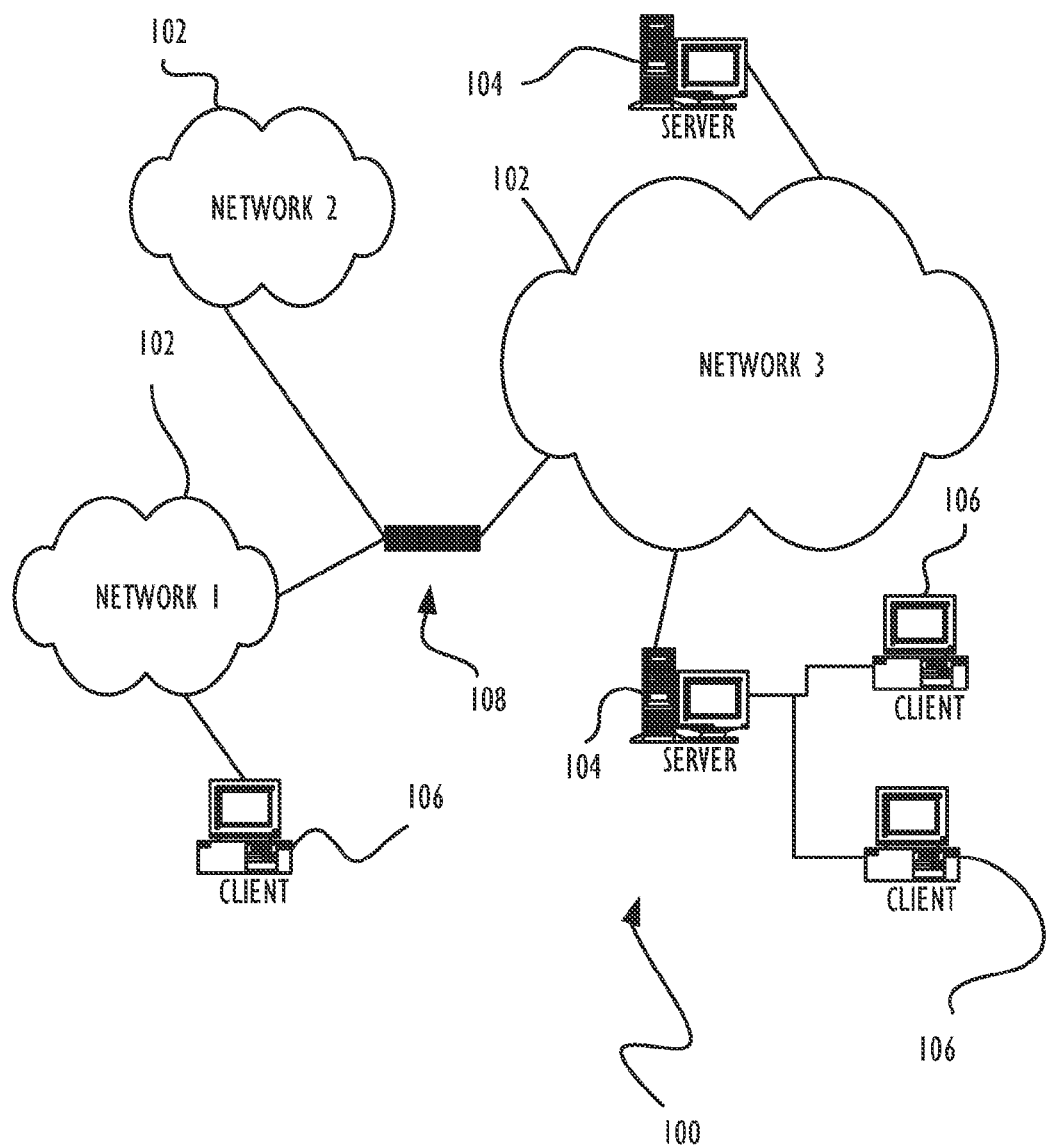
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
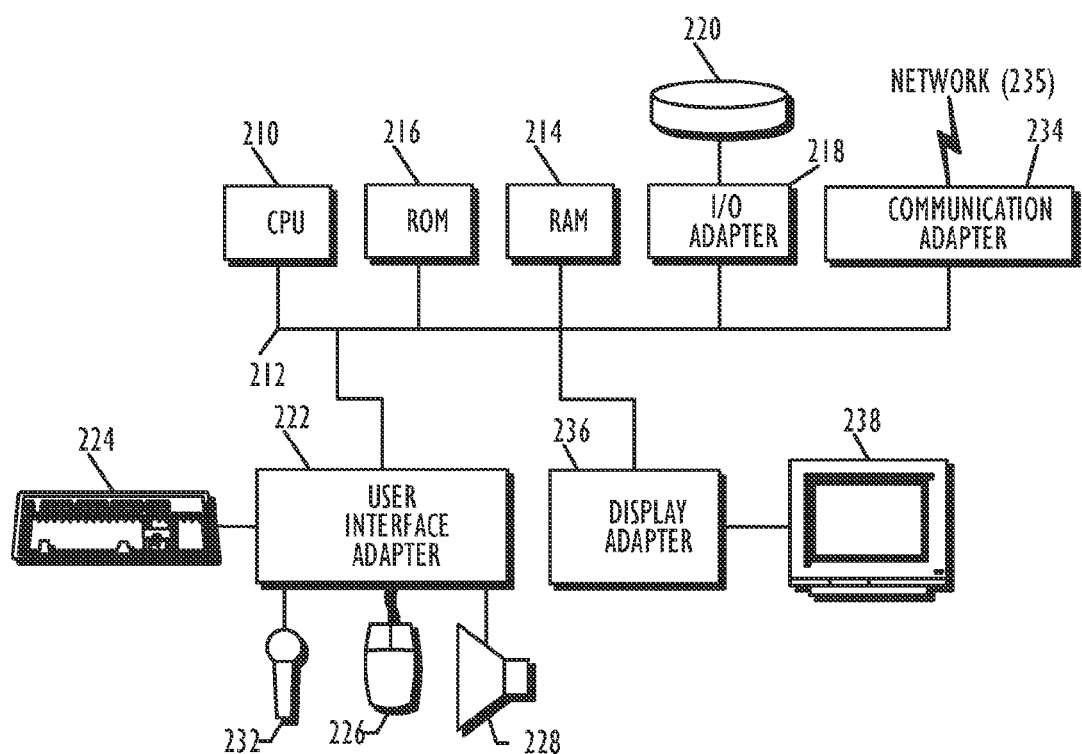
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
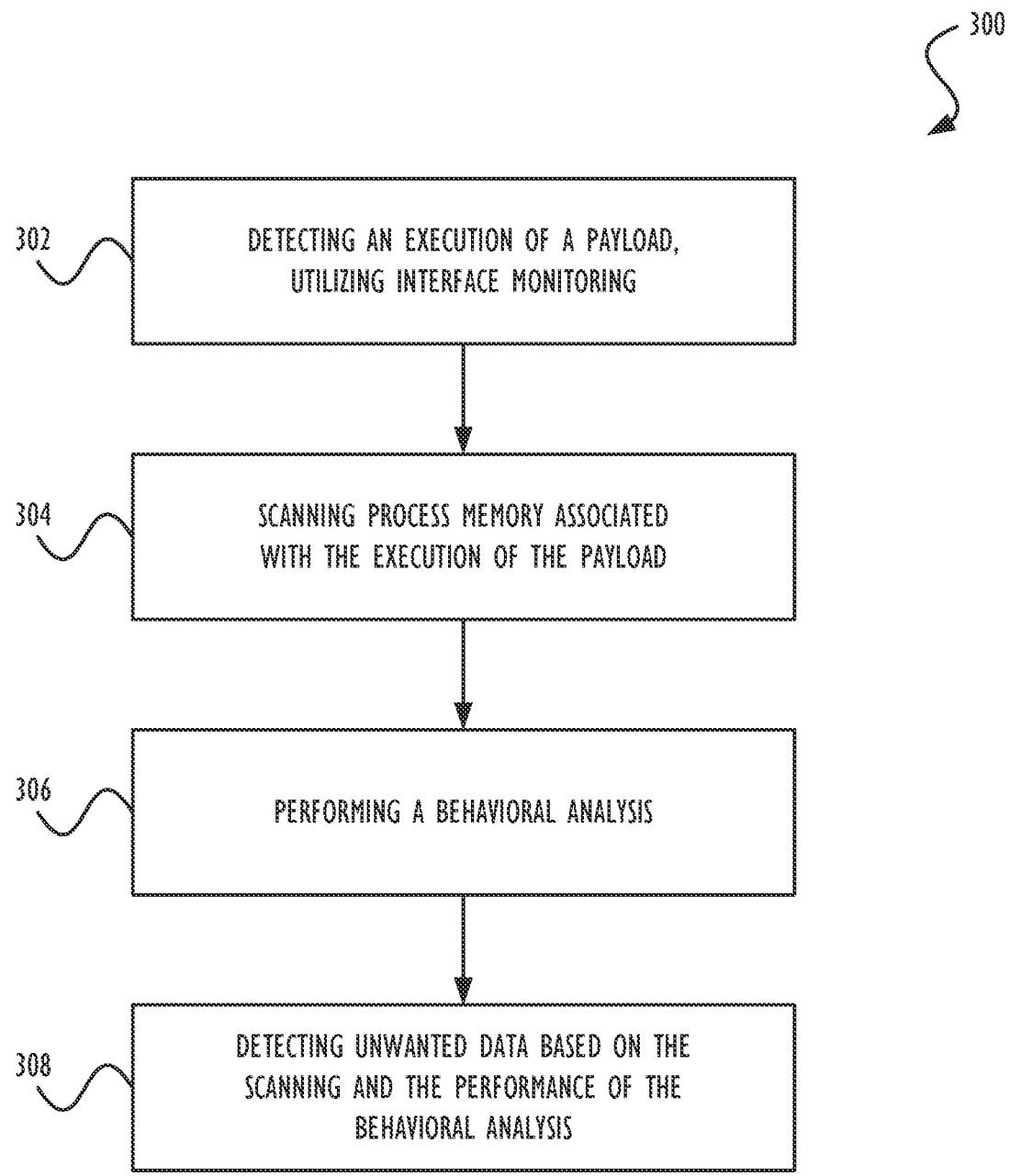
FIG. 3 shows a method for detecting unwanted data based on scanning associated with a payload execution and a behavioral analysis, in accordance with one embodiment.

FIG. 3 shows a method 300 for detecting unwanted data based on scanning associated with a payload execution and a behavioral analysis, in accordance with one embodiment. As an option, the method 300 may be carried out in the context of the architecture and environment of FIGS. 1 and/or 2. Of course, however, the method 300 may be carried out in any desired environment.

As shown in operation 302, an execution of a payload is detected, utilizing interface monitoring. With respect to the present description, the payload may include any executable form of code capable of being executed. The executable form of the code may include a form of the code capable of being presented to an execution unit (e.g. CPU) for executing the code.

For example, the payload may include unpacked code, a self-extracted compression file (e.g. code extracted during execution of the code), etc. To this end, the payload may optionally include an executable. Optionally, execution of the payload may be performed by a processor.

Also with respect to the present description, the interface monitoring may include monitoring of interfaces that are capable of being utilized to detect the execution of the payload. In one embodiment, the interface monitoring may include monitoring only predetermined interfaces. Such predetermined interfaces may be selected based on a determination that the predetermined interfaces are of use to a payload associated with unwanted data. Just by way of example, the predetermined interfaces may include an interface for loading a module (e.g. a dynamic-link library), an interface for allocating and/or modifying a memory protection, an interface for spawning a process (e.g. from another process), etc.

Additionally, the interface monitoring may detect the execution of the payload by detecting use of a monitored interface by the payload. As an option, the interface monitoring may detect the execution of the payload by detecting execution of an interface invoked by the execution of the payload. Of course, however, the interface monitoring may be utilized in any manner for detecting the execution of the payload.

As an option, the interface monitoring may include direct interface monitoring. In one embodiment, the interface monitoring may be performed by hooking an interface. For example, the interface monitoring may be performed utilizing in-line hooking of the interface. Such in-line hooking may optionally include identifying a return address of an immediate call frame (e.g. in a call frame stack) that invoked the monitored interface. Such return address may identify a memory location of code (e.g. the payload) that invoked the monitored interface.

In another embodiment, the interface monitoring may be performed utilizing function pointer redirection. As described above, a return address of an immediate call frame (e.g. in a call frame stack) that invoked the monitored interface may be identified via the function pointer redirection.

In yet another embodiment, the interface monitoring may be performed, utilizing a callback (e.g. an operating system supplied callback, etc.). The callback may identify a memory address of the code that invoked the monitored interface. As another option, a call stack analysis may be used to identify the code that invoked the monitored interface from call frames included in the call stack.

In still yet another embodiment, the interface monitoring may be performed utilizing filter drivers. For example, a filter callback may identify a memory location of code that invoked the monitored interface. As another option, a call stack analysis may be used with an operating system supplied callback to identify a memory location of code that invoked the monitored interface. In one optional embodiment, the interface monitoring may include indirect interface monitoring. While various embodiments of interface monitoring have been described above, it should be noted that the interface monitoring may include any desired type of interface monitoring capable of being utilized to detect the execution of the payload.

In addition, as shown in operation 304, process memory associated with the execution of the payload is scanned. In one embodiment, scanning the process memory may include comparing the process memory to signatures of known unwanted data. Such known unwanted data may include any data predetermined to be unwanted, such as malware, spyware, etc. Of course, however, the process memory may be scanned in any desired manner (e.g. for determining whether the payload is associated with unwanted data).

In one embodiment, the process memory may be identified via the interface monitoring. Just by way of example, the code that invoked a monitored interface, as identified by the interface monitoring, may include the process memory that is scanned. Thus, if the payload directly invoked the monitored interface, memory associated with the payload (e.g. storing the payload) may be scanned.

As another example, the process memory may include code included in call frames of a call stack which resulted in invocation of a monitored interface. In this way, if the payload indirectly invoked the monitored interface, memory associated with the payload (e.g. storing the payload) may be identified via the call stack such that the identified memory is scanned.

As an option, data affected by invocation of a monitored interface may also be scanned. Such data may be identified via the interface monitoring, for example. In one exemplary embodiment, the data may include a memory region with protection settings that are modified by the monitored interface [e.g. an operating system supplied application programming interface (API), such as Microsoft® Windows® VirtualProtect, etc.]. Such data may be scanned since the data may include code (e.g. unwanted data) that is in the process of being unpacked, modified, or re-marked as execute only code after being unpacked (e.g. for avoiding detection).

As another option, only predetermined types of the process memory may be scanned. In one embodiment, the predetermined types of the process memory may include memory regions that do not belong to an executable module (e.g. are dynamically allocated memory regions instead of memory regions populated by loading of an executable). In another embodiment, the predetermined types of the process memory may include memory regions that do belong to an executable module, but which have had data written thereto after an initial population by the loading of an executable.

Preventing scanning of process memory other than the predetermined types of process memory may optionally reduce an amount of process memory scanned. Monitoring of memory management interfaces may optionally be the basis for only allowing the predetermined types of process memory to be scanned, as an option. For example, memory allocation may be detected via monitoring of allocation interfaces. In addition, after population by the loading of a module, the loaded memory region may be set to be write-protected. Moreover, the interface monitoring may detect when the protection attributes of the memory region are altered to allow writing to such memory region.

Furthermore, a behavioral analysis is performed, as shown in operation 306. With respect to the present description, the behavioral analysis may include any analysis of at least one behavioral aspect. In one embodiment, the behavioral analysis may include analyzing results of the scanning with other scanning results associated with previous executions of the payload.

For example, the results of the scanning may indicate whether the process memory associated with the execution of the payload matched a signature of known unwanted data, matched a portion of a signature of known unwanted data, etc. As an option, such results may be aggregated (e.g. in a central database, etc.) with the other scanning results identified based on previous executions of the payload. As an option, the behavioral analysis may be based on other events associated with any executions of the payload.

In another embodiment, the behavioral analysis may include determining whether a predetermined amount of the payload has executed (e.g. when the payload has utilized a predetermined amount its code during execution). Such predetermined amount may be determined based on interface monitoring and an examination of a non-executable form (e.g. a packed form, a stored form, etc.) of code, the executable form of which includes the payload. As another option, the predetermined amount may be determined based on data collected from previous executions of the payload, such as a number of previous executions of the payload, etc.

Still yet, unwanted data is detected based on the scanning and the performance of the behavioral analysis. Note operation 308. As noted above, the unwanted data may include malware, spyware, etc. Of course, however, the unwanted data may include any type of data that is unwanted.

In one embodiment, if the scanning indicates that the code that invoked the monitored interface matches a signature of known unwanted data, the unwanted data may be detected. Optionally, the code that invoked the monitored interface may either directly include the payload or may be indirectly associated with the execution of the payload, and may be identified via the interface monitoring for determining whether such code includes unwanted data.

In another embodiment, unwanted data may be detected if it is determined by the behavioral analysis that the results of the scanning (e.g. as analyzed with other scanning results associated with previous executions of the payload) indicate an existence of unwanted data. Of course, however, the unwanted data may be detected in any manner that is based on the scanning and the performance of the behavioral analysis.

To this end, unwanted data may optionally be detected with respect to execution of a payload. Thus, unwanted data that includes code that is maliciously obscured to evade detection when in a non-executable form (e.g. packed code, etc.) may be detected.

More illustrative information will now be set forth regarding various optional architectures and features with which the foregoing technique mayor may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
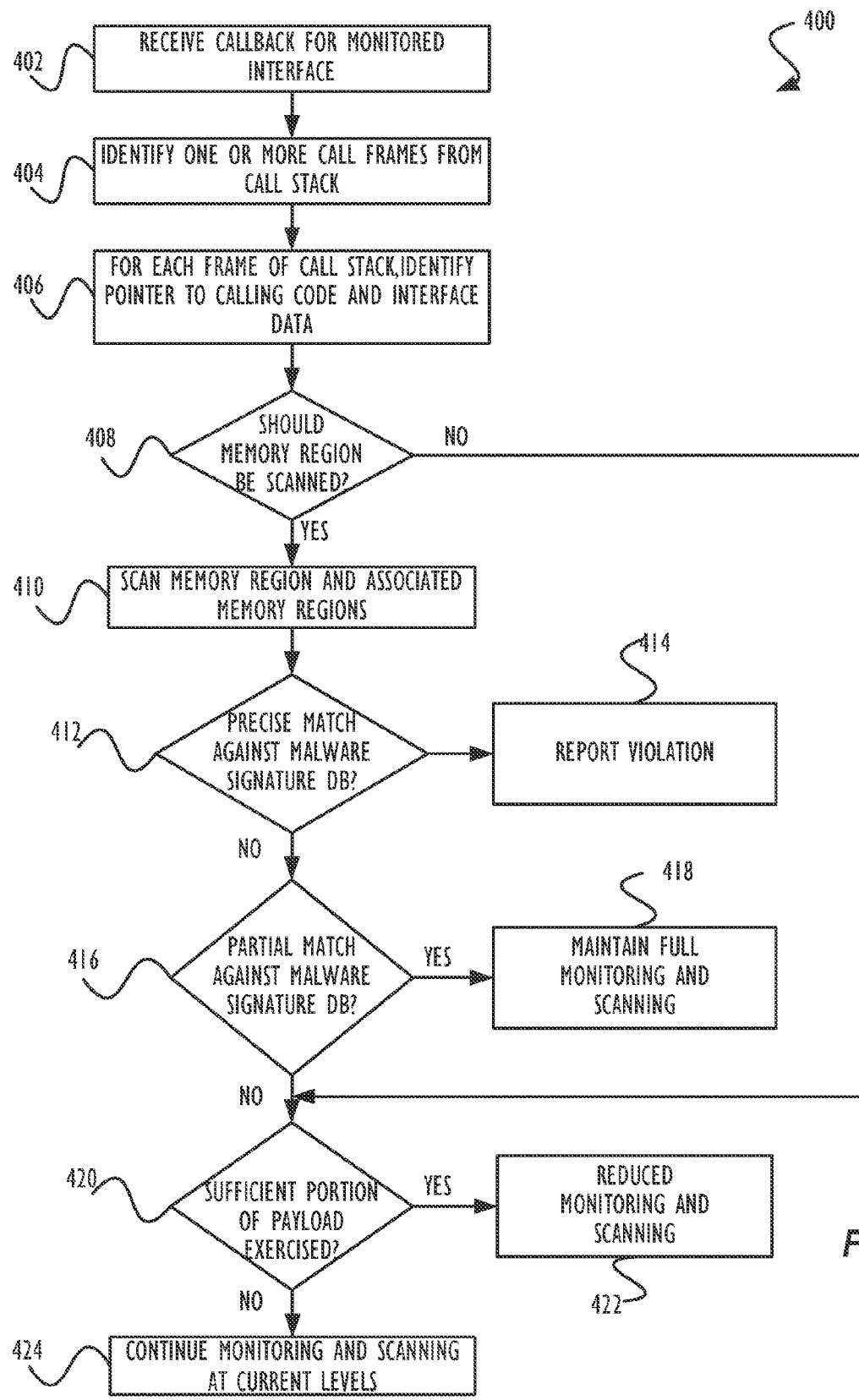
FIG. 4 shows a method for detecting unwanted data based on scanning associated with a payload execution and a behavioral analysis, in accordance with another embodiment.

FIG. 4 shows a method 400 for detecting unwanted data based on scanning associated with a payload execution and a behavioral analysis, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a callback for a monitored interface is received. With respect to the present embodiment, the callback may be received via interface monitoring. Thus, the callback may indicate that the monitored interface has been invoked. Also with respect to the present embodiment, the monitored interface may include an interface invoked by execution of a payload.

Additionally, one or more call frames are identified from a call stack. Note operation 404. The call stack may be associated with the monitored interface. For example, the call stack may include at least one call frame (e.g. function call, etc.) which resulted in the invocation of the monitored interface.

Further, as shown in operation 406, for each call frame of the call stack, a pointer to calling code along with a pointer to interface data are identified. The calling code may include the code which called the function, etc. indicated by the associated call frame. To this end, the pointer to calling code may include a pointer to a memory region in which the calling code is stored. Accordingly, if a call frame of the call stack directly invoked the monitored interface, the calling code may be determined to be directly associated with the monitored interface (e.g. may have directly invoked the monitored interface).

As another option, the calling code may include code that indirectly invoked the monitored interface (e.g. code not pointed to by a call frame of the call stack, but which invoked code associated with a call frame of the call stack). Just by way of example, hosted code may indirectly invoke the monitored interface, where a direct caller of the monitored interface is a host (e.g. interpreter, virtual machine, etc.) and the indirect calling code (e.g. the true caller) of the monitored interface is not directly associated with a call frame of the call stack. The indirect calling code may be identified by monitoring interface invocations by the hosted code. Just by way of example, the indirect calling code may include unwanted data that utilizes a hosted code to unpack a payload of the unwanted data into a format that resides in data and that is executed within a virtual machine.

It should be noted that the calling code may be loaded into the memory regions in any desired manner, such as by decompressing a portion of a non-executable form of the code. Additionally, the loading may include runtime modification of the non-executable form or of previously unpacked code.

In addition, in one embodiment, the interface data may include parameters passed to the monitored interface during invocation thereof. For example, the interface data may include non-executable data. Thus, the pointer to the interface data may point to a memory region in which the interface data is stored.

Moreover, as shown in decision 408, it is determined whether the memory regions pointed to by the pointers to the calling code and the pointers to the interface data are to be scanned. For example, it may be determined whether the memory regions include predetermined types of memory regions (e.g. that do not belong to an executable module, etc.). In this way, it may be determined that only memory regions that include the predetermined types of memory regions are to be scanned.

For each memory region in which it is determined that such memory region is to be scanned, operations 410-424 described herein below may be performed. Thus. for each memory region in which it is determined that such memory region is to be scanned, the memory region and any associated memory regions are scanned. Note operation 410. The scan may include comparing code stored in the memory region with a signature of known malware, in one embodiment. Thus, with respect to the present embodiment, the memory region and associated memory regions may be scanned for malware.

In one embodiment, the associated memory regions may include memory regions pointed to by the scanned memory region. In another embodiment, the associated memory regions may include memory regions to which control is transferred by the scanned memory region. Of course, however, the associated memory regions may include any memory regions associated with the scanned memory region.

As an option, the associated memory regions may be scanned based on results of the scanned memory region. For example, if it is determined based on the scanning that the scanned memory region does not include malware, any memory regions associated with the scanned memory region may be scanned. If, however, it is determined based on the scanning that the scanned memory region does include malware, the associated memory regions may be prevented from being scanned.

Still yet, it is determined in decision 412 whether a precise match exists between the scanned memory region and/or the associated memory regions and a database of malware signatures. The precise match may include a determination that any of the scanned memory region and the associated memory regions completely match a malware signature.

If it is determined that a precise match exists, a violation is reported, as shown in operation 414. For example, malware may be detected based on the precise match. As another example, an indication of the detection of the malware may be reported.

If, however, it is determined that a precise match does not exist, it is further determined whether a partial match exists between the scanned memory region and/or the associated memory regions and the database of malware signatures. Note decision 416. For example, it may be determined whether the memory region matches only a portion of a malware signature.

As an option, a predefined set of malware signatures may be utilized for determining whether a partial match exists. The malware signatures in such predefined set may be different from the malware signatures utilized in determining whether a precise match exists (in decision 410). For example, each malware signature in the predefined set of malware signatures may indicate characteristics that are at least potentially indicative of malware, whereas the malware signatures for which a precise match may be made may indicate characteristics that are definitively indicative of malware.

If it is determined in decision 416 that a partial match exists, a level of interface monitoring and scanning is maintained. Note operation 418. For example, the level of interface monitoring and scanning utilized for receiving the callback (in operation 402) and scanning the memory region (in operation 410) may be maintained. Such level may be maintained for further execution of the payload (e.g. if the payload has not finished execution) or for subsequent executions of the payload.

As an option, the level of monitoring which is maintained may include full monitoring (e.g. full utilization of monitoring resources). As another option, the level of scanning which is maintained may include a full scanning (e.g. full utilization of scanning resources). For example, when the payload is first executed, full monitoring and scanning may be employed with respect to the payload.

In one embodiment, if it is determined that a partial match exists, a level of suspicion of the payload may be raised. For example, a probability that the payload includes malware may be increased and stored for use during a behavioral analysis of the payload. Such behavioral analysis may consider the probability that the payload includes malware in detecting malware associated with the payload. As another option, an indication of the partial match may be stored for use during the behavioral analysis.

If it is determined in decision 416 that a partial match does not exist, it is determined whether a sufficient (e.g. predetermined, threshold, etc.) portion of the payload has been executed. Note decision 420. In one embodiment, a total amount of the payload may be compared with a portion of the payload that has been executed for determining whether a sufficient portion of the payload has been executed.

In another embodiment, a behavioral analysis may be utilized for determining whether a sufficient portion of the payload has been executed. Just by way of example, the behavioral analysis may determine whether a number of previous executions of the payload meets a predetermined number.

If it is determined that a sufficient portion of the payload has been executed, the level of interface monitoring and scanning is reduced. Note operation 422. For example, the level of interface monitoring may be reduced to less than full monitoring. As another example, the level of scanning may be reduced to less than full scanning (e.g. such that less than the full amount of scanning resources are utilized). In one embodiment, the reduced level of interface monitoring and scanning may be applied to further execution of the payload or for subsequent executions of the payload.

In this way, the level of interface monitoring and scanning may be adjusted based on the behavioral analysis. For example, as noted above, the level of interface monitoring and scanning may be reduced if a sufficient amount of the payload has executed and if a detection of malware has not been identified based on the scanning. Such reduction may optionally decrease performance impact resultant from the interface monitoring and scanning.

If it is determined decision 420 that a sufficient portion of the payload has not been executed, the interface monitoring and scanning is maintained at the current level. Note operation 424. As an option, the level of the interface monitoring and scanning may be raised if the payload is updated, if a level of suspicion of the payload is raised, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions stored thereon that when executed cause one or more processing units to:
   detect an execution of a payload by utilizing interface monitoring;
   scan process memory associated with the execution of the payload for a match against at least one of a predefined plurality of signatures representing known unwanted data;
   perform a behavioral analysis to determine whether a threshold amount of the payload has executed;
   report a violation based on a precise match against at least one of the predefined plurality of signatures representing known unwanted data; and
   maintain a level of interface monitoring and a level of process memory scanning based on a partial match against at least one of the predefined plurality of signatures representing known unwanted data, to manage a performance impact of the interface monitoring and process memory scanning.

2. The non-transitory computer readable medium of claim 1, wherein the payload comprises an executable form of code.

3. The non-transitory computer readable medium of claim 1, wherein the payload comprises unpacked code.

4. The non-transitory computer readable medium of claim 1, wherein the instructions that when executed cause one or more processing units to detect the execution of the payload by utilizing interface monitoring comprise instructions that when executed cause one or more processing units to monitor predetermined interfaces.

5. The non-transitory computer readable medium of claim 4, wherein the instructions that when executed cause one or more processing units to monitor predetermined interfaces comprise instructions that when executed cause one or more processing units to monitor at least one of an interface for loading a module, an interface for allocating and modifying a memory protection, and an interface for spawning a process.

6. The non-transitory computer readable medium of claim 1, wherein the instructions that when executed cause one or more processing units to detect the execution of the payload by utilizing interface monitoring comprise instructions that when executed cause one or more processing units to detect the execution of the payload by detecting execution of an interface invoked by the execution of the payload.

7. The non-transitory computer readable medium of claim 1, wherein the instructions that when executed cause one or more processing units to scan the process memory comprise instructions that when executed cause one or more processing units to scan data affected by invocation of a monitored interface.

8. The non-transitory computer readable medium of claim 1, wherein the instructions that when executed cause one or more processing units to scan process memory comprise instructions that when executed cause one or more processing units to scan only predetermined types of process memory.

9. The non-transitory computer readable medium of claim 1, wherein the instructions that when executed cause one or more processing units to scan process memory comprise instructions that when executed cause one or more processing units to determine whether the process memory matches only a portion of a signature from the predefined plurality of signatures representing known unwanted data.

10. The non-transitory computer readable medium of claim 9, wherein the level of interface monitoring and the level of process memory scanning are maintained for subsequent executions of the payload if the process memory matches only the portion of the signature.

11. The non-transitory computer readable medium of claim 1, wherein the instructions that when executed cause one or more processing units to perform the behavioral analysis comprise instructions that when executed cause one or more processing units to compare a current execution of the payload to previous executions of the payload.

12. The non-transitory computer readable medium of claim 1, further comprising instructions that when executed cause one or more processors to:
reduce the level of interface monitoring and the level of process memory scanning after a predetermined amount of the payload has executed without matching any of the plurality of signatures.

13. A method, comprising:
detecting, by a processor device using interface monitoring, an execution of a payload;
scanning process memory associated with the execution of the payload for a match against at least one of a predefined plurality of signatures representing known unwanted data;
performing a behavioral analysis to determine whether a threshold amount of the payload has executed; and
maintaining a level of interface monitoring and a level of process memory scanning responsive to at least a partial match of at least one of the predefined plurality of signatures, to manage a performance impact of the interface monitoring and process memory scanning.

14. The method of claim 13, wherein scanning process memory comprises:
scanning process memory initially at a second level; and
maintaining the second level responsive to a partial match of any of the predefined plurality of signatures.

15. The method of claim 14, further comprising:
reducing the second level after a predetermined amount of the payload has executed without matching any of the predefined plurality of signatures.

16. The method of claim 13, further comprising:
reducing the level of interface monitoring after a predetermined amount of the payload has executed without matching any of the predefined plurality of signatures.

17. The method of claim 13, further comprising:
reporting a violation responsive to a complete match of any of the plurality of signatures.

18. A method, comprising:
detecting, by a processor device utilizing interface monitoring, an execution of a payload;
scanning process memory associated with the execution of the payload for a match against at least one of a predefined plurality of signatures representing known unwanted data;
performing a behavioral analysis to determine whether a threshold amount of the payload has executed;
reporting a violation based on a precise match against at least one of the predefined plurality of signatures representing known unwanted data; and
maintaining a level of interface monitoring and a level of process memory scanning based on a partial match against at least one of the predefined plurality of signatures representing known unwanted data, to manage a performance impact of the interface monitoring and process memory scanning.

19. The method of claim 18, further comprising:
reducing the level of interface monitoring and the level of process memory scanning when a predetermined amount of the payload has executed and unwanted data has not been detected based on the process memory scanning.

20. A system, comprising:
a hardware processor;
a memory, coupled with the processor, the memory configured to store data associated with execution of a program on the processor;
an operating system, comprising one or more interfaces configured to provide access to functions provided by the operating system; and
a storage unit, coupled to the processor, on which is stored instructions that when executed cause the processor to:
detect an execution of a payload by monitoring one or more of the interfaces;
scan the memory for a match against at least one of a predefined plurality of signatures representing known unwanted data;
perform a behavioral analysis to determine whether a threshold amount of the payload has executed; and
maintain a level of interface monitoring and a level of memory scanning based on a partial match against at least one of the predefined plurality of signatures representing known unwanted data, to manage a performance impact of the interface monitoring and memory scanning.

21. The system of claim 20, wherein the instructions further comprise instructions that when executed cause the processor to:
reduce the level of interface monitoring and the level of memory scanning after a predetermined amount of the payload has executed without matching any of the plurality of signatures.

22. The system of claim 20, wherein the instructions further comprise instruction that when executed cause the processor to:
report a violation based on a precise match against at least one of the predefined plurality of signatures representing known unwanted data.

23. A system, comprising:
one or more hardware processors;
a process memory, coupled with the processors, the memory configured to store data associated with execution on the processors;

an operating system that when executed by the one or more processors provides one or more interfaces configured to provide access to functions provided by the operating system; and a storage unit, coupled to the processors, on which is stored instructions that when executed cause the processors to:
    detect an execution of a payload by utilizing monitoring of an interface of the one or more interfaces;
    perform a behavioral analysis to determine whether a threshold amount of the payload has executed;
    scan the process memory for a match against at least one of a predefined plurality of signatures representing known unwanted data; and
    maintain a level of interface monitoring and a level of process memory scanning responsive to a partial match of at least one of the predefined plurality of signatures, to manage a performance impact of the interface monitoring and process memory scanning.

24. The system of claim 23, wherein the instructions further comprise instructions that when executed cause the processing units to:
    adjust the level of interface monitoring or the level of process memory scanning responsive to execution of a predetermined portion of the payload without a match of any of the predefined plurality of signatures.

25. The system of claim 24, wherein the instructions that when executed cause the processing units to adjust the level interface monitoring or the level of process memory scanning comprise instructions that when executed cause the processing units to:
    reduce the level of interface monitoring and the level of process memory scanning.

* * * * *